United States Patent [19]
Peters et al.

[11] Patent Number: 5,794,433
[45] Date of Patent: Aug. 18, 1998

[54] THRUST REVERSER DOOR SIDE FILLERS

[75] Inventors: Fred H. Peters; Thomas J. Jannetta. both of Tulsa. Okla.

[73] Assignee: The Nordam Group, Inc.. Tulsa. Okla.

[21] Appl. No.: 665,743

[22] Filed: Jun. 18, 1996

[51] Int. Cl.$^6$ ............................................. F02K 3/02
[52] U.S. Cl. ........................ 60/226.2; 60/230; 244/110 B; 239/265.29
[58] Field of Search .................. 239/265.19, 265.27, 239/265.29; 244/110 B; 60/226.2, 230, 262

[56] References Cited

U.S. PATENT DOCUMENTS

| | | | |
|---|---|---|---|
| 3,015,936 | 1/1962 | Brewer | 244/110 B |
| 3,492,821 | 2/1970 | Monaghan et al. | 60/262 |
| 3,610,534 | 10/1971 | Medawar | 239/265.29 |
| 3,655,134 | 4/1972 | Greenland et al. | 60/230 |
| 3,915,415 | 10/1975 | Pazmany | 244/110 B |
| 3,917,198 | 11/1975 | Sanders | 244/110 B |
| 4,069,663 | 1/1978 | Harper et al. | 60/226.2 |
| 5,097,661 | 3/1992 | Lair et al. | 60/226.2 |
| 5,103,634 | 4/1992 | Harrison et al. | 60/204 |
| 5,284,015 | 2/1994 | Carimali et al. | 60/226.2 |
| 5,396,762 | 3/1995 | Standish | 60/226.2 |

*Primary Examiner*—Charles G. Freay
*Attorney, Agent, or Firm*—Head. Johnson & Kachigian

[57] ABSTRACT

An improved target-type thrust reverser for use with an aircraft jet engine. Jet engines typically are housed in a nacelle and the engine terminates with an exhaust nozzle. The thrust reverser includes an upper door having a shape of a segment of a hollow frusto-conical member with an inner and outer surface. opposed longitudinal edges that taper towards each other. a forward semi-circular edge and a rearward semi-circular edge. The lower door is substantially identical. A pair of linkage arms pivotally support each of the upper and lower doors so that the doors are translatable between stowed and actuated positions. When in the stowed positions. the exterior surface of the doors form a part of the exterior surface of the engine nacelle. When in the actuated position. the doors are positioned rearwardly of the engine exhaust nozzle with their rearward edges in abutment. The inner surfaces of the doors form a generally concave exhaust gas intercepting target that diverts exhaust gases from the nozzle in directions having rearward thrust force tangents. A pair of side filler panels are extensions of each door at the junction of each of the longitudinal edges and the rearward edge. the side fillers serving to enlarge the concave exhaust gas intersecting target and thereby increase the reverse thrust force tangents.

6 Claims, 5 Drawing Sheets

THRUST REVERSER DOOR SIDE FILLERS

REFERENCE TO PENDING APPLICATIONS

This application is not related to any pending applications.

REFERENCE TO MICROFICHE APPENDIX

This application is not referenced in any microfiche appendix.

BACKGROUND OF THE INVENTION

The present invention relates to a thrust reverser system for a jet aircraft engine. Specifically, the invention is concerned with a target-type thrust reverser system for a jet aircraft engine having an exhaust nozzle. The thrust reverser system functioning to translate pivoted doors to form a concave surface that intersects the stream of exhaust gases from the engine and diverts the stream in directions producing reverse thrust force tangents.

The typical jet airplane is a fairly heavy object and lands at a high speed, such as, in some cases, in excess of 100 mph. This high speed and weight creates a substantial inertial energy. To bring the aircraft to a stop, or to at least a speed where it is safe to maneuver the aircraft on the ground, requires substantial braking action. In order to shorten the required runway length for safe landing of jet engines, it has become a common practice to equip jet airplanes with thrust reversers. The need for thrust reversers substantially increases when a jet airplane is required to land on a runway that is wet with rain or that has ice or snow since, obviously, the usual aircraft wheel brakes are substantially less effective when the runway surface is not dry. Accordingly, it has become a common practice to provide thrust reversers for augmenting braking of aircrafts during landings.

The objective of a thrust reverser is to utilize the thrust produced by the exhaust gases of jet engines to counteract the inertia of the aircraft when landing. More specifically, the function of a thrust reverser is to change the direction of a jet aircraft engine exhaust gases so that a reverse thrust tangent is produced.

For background information about thrust reversers, reference may be had to the following United States patents:

| PATENT NO. | INVENTOR | TITLE |
|---|---|---|
| 3492821 | Monaghan et al | Thrust Reversing Means For A Gas Turbine Bypass Engine |
| 3915415 | Pazmany | Overwing Thrust Reverser |
| 3917198 | Sanders | Overwing Post Exit Blocker/Deflector Door Thrust Reverser |
| 5097661 | Lair et al | Jet Engine Having A Planar Exit Opening |
| 5103634 | Harrison et al | Thrust Reversing System and Method |
| 5284015 | Carimali et al | Turbojet Engine Thrust Reverser With Directional Control |
| 5396762 | Standish | Thrust Reversal Assembly For Controlling Sidewardly Diverted Flow |

BRIEF SUMMARY OF THE INVENTION

This invention provides an improved target-type thrust reverser system for use with an aircraft jet engine having a nacelle and an exhaust nozzle through which thrust producing exhaust gases are passed. The thrust reverser includes an upper door having substantially the shape of a segment of a hollow frusto-conical member. The upper door has inner and outer surfaces and opposed longitudinal edges that taper towards each other. The upper door is further defined by a forward generally semi-circular edge and a rearward generally semi-circular edge, the diameter of the rearward semi-circular edge being less than that of the forward semi-circular edge.

The lower door is shaped the same as the upper door, that is, it has inner and outer surfaces, opposed longitudinal edges, a forward semi-circular edge and a rearward semi-circular edge.

A pair of linkage arms pivotally support each of the upper and lower doors so that the doors are translatable between stowed and actuated positions. When in the stowed positions, the exterior surfaces of the doors form a part of the exterior surface of the engine nacelle. When in the actuated positions, the rearward semi-circular edges of the doors abut and the door longitudinal edges intersect each other in opposed obtuse angles.

In the actuated position, the inner surfaces of the doors form a generally concave exhaust gas intersecting target. This target functions to divert the exhaust gases from the engine nozzle in directions having reverse thrust force tangents.

A pair of side filler panels are extensions of each door at the junction of each of the longitudinal edges and the semi-circular rearward edge. The side filler panel serves to enlarge the concave exhaust gas intersecting target to thereby increase the reverse thrust force tangents.

In one embodiment, the thrust reverser is employed in a system wherein the engine nacelle has opposed first and second stang fairings. A portion of each of the stang fairings extends rearwardly of the engine exhaust nozzle and generally in a plane of the engine longitudinal axis. The stang fairings enclose the linkage arms when the doors are in the stowed position. When in the stowed position, the longitudinal edges of each of the doors fit against portions of the stang fairings.

The side filler panels are covered by the stang fairings when the doors are in the stowed position, that is, the side filler panels fit inwardly of the stang fairings.

A better understanding of the invention will be obtained from the following description of the preferred embodiment and claims, taken in conjunction with the attached drawings.

DESCRIPTION OF THE DRAWINGS

FIG. 1 shows the nozzle portion of the engine and a portion of the engine nacelle with rearwardly extending stang fairings. Further, FIG. 1 shows the upper and lower thrust reverser doors in the deployed position wherein the doors form a concave target to intersect exhaust gases passing from the jet engine exhaust nozzle. The doors include side filler panels that enlarge the concave target and thereby increase the reverse thrust force tangents produced by the jet engine exhaust gases.

FIG. 2 shows in dotted outline the jet engine exhaust nozzle and in solid outline a portion of the engine nacelle and a portion of one of the stang fairings. The upper and lower doors of the thrust reverser as pivotally supported by the linkage arms is shown in solid outline in an intermediate position between the stowed position and the actuated position. The thrust reverser doors and linkage arms are shown in dotted outline in the stowed position, in an earlier intermediate position and in a deployed position.

DETAILED DESCRIPTION OF THE PREFERRED EMBODIMENT

Figure 5:
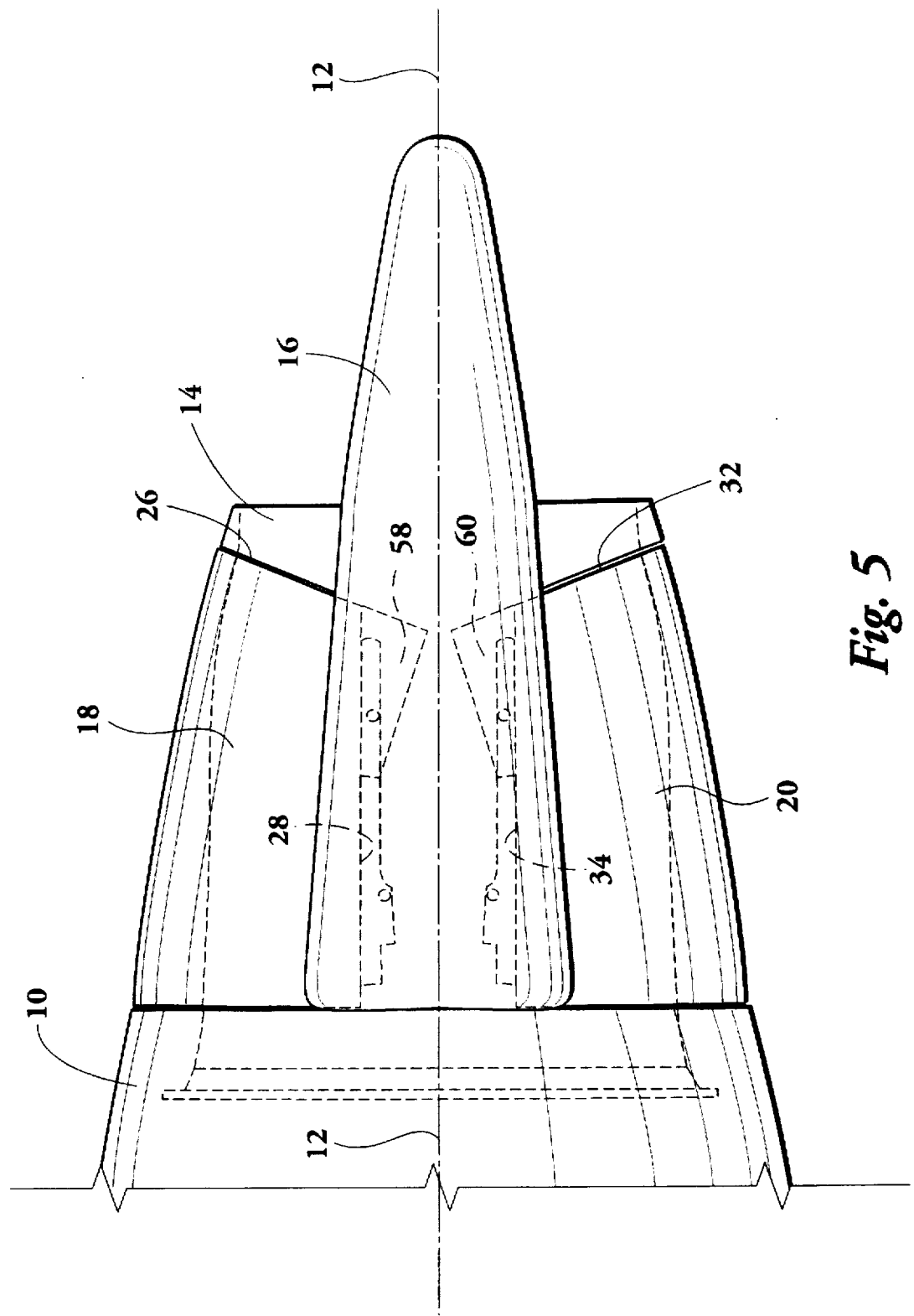
FIG. 5 is a side elevational view as in FIG. 3 showing the thrust reverser doors in their stowed positions.

Referring first to FIG. 5, an external view of a rearward portion of a jet aircraft engine having the improved thrust reverser of this invention is illustrated. The jet engine is housed in a nacelle 10, a rearward portion of which is shown. The engine itself, that is, the engine that produces thrust gases is not illustrated, but the engine has a generally longitudinal axis 12 and terminates in a nozzle 14. Rearwardly extending from the engine are stang fairings 16, only one of which is seen in FIG. 5, the opposed stang fairing being of the same appearance. The stang fairings are generally paralleled to each other and generally in a plane of the engine longitudinal axis 12.

The thrust reverser is formed by an upper door 18 and a lower door 20 that, when in the stowed position as shown in FIG. 5, form a streamline continuation of engine nacelle 10.

Figure 3:
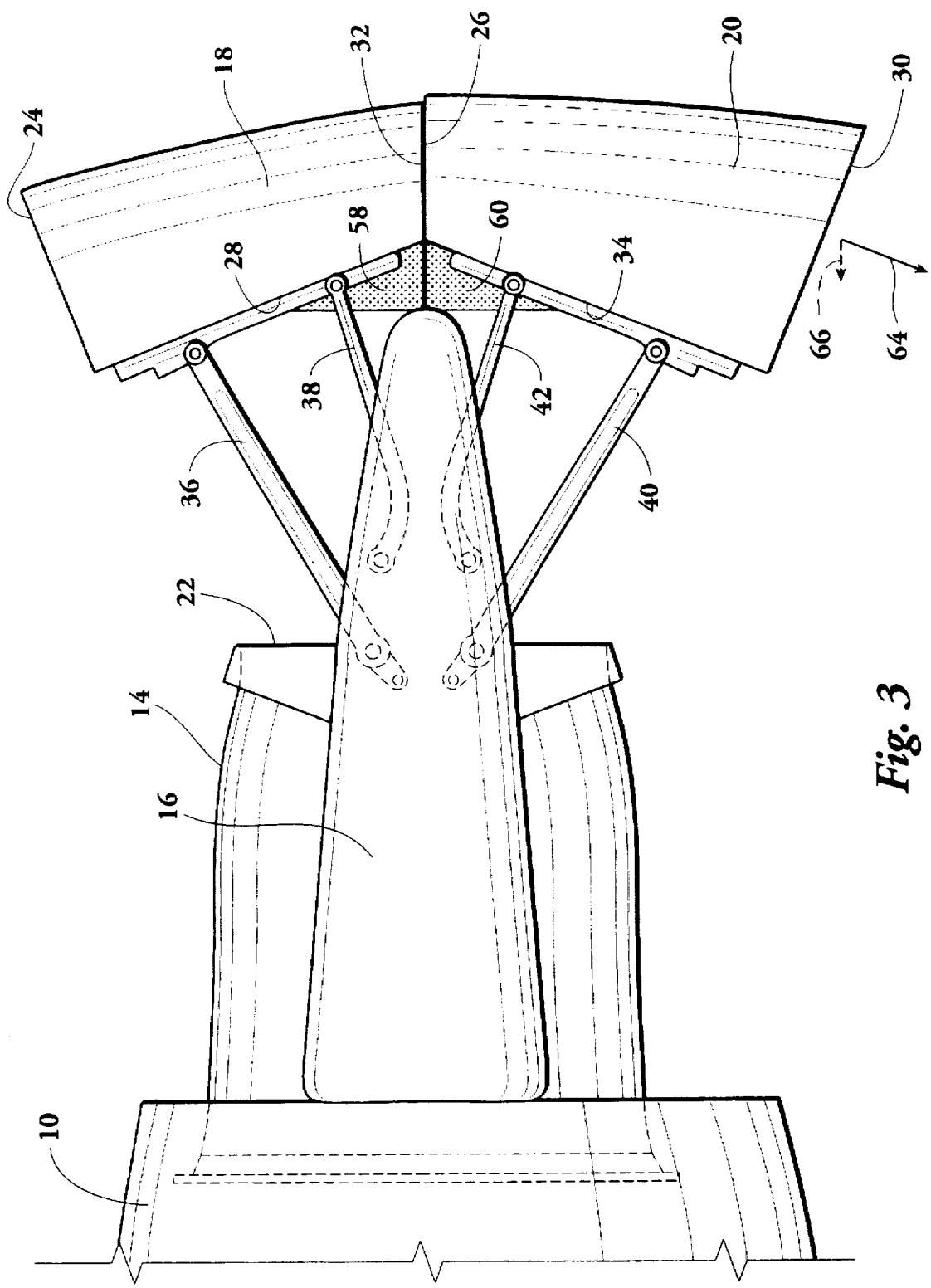
FIG. 3 is an elevational side view of the thrust reverser system showing the thrust reverser doors in the deployed position.

Referring now to FIG. 3, the thrust reverser system is shown in an actuated or deployed condition as compared to the stowed condition of FIG. 5. FIG. 3 reveals more of the engine nozzle 14, having an anti-drag fairing 22. Each of the doors 18 and 20 are in the shape of a segment of a hollow frusto-conical member. Upper door 18 has a forward end 24 and a rearward end 26. Both the forward and rearward ends are semi-circular. The upper door is further defined by longitudinal edges, first longitudinal edge 28 being seen in FIG. 3.

Lower door 20 in like manner has a forward edge 30, a rearward edge 32, and longitudinal edges, one such edge 34 being seen in FIG. 3. In the deployed position, the inner edges 26 and 32 of upper and lower doors 18 and 20 abut with each other and the longitudinal edges 28 and 34 extend towards each other at an obtuse angle.

Each of the doors is pivotally supported by a pair of linkage arms. Specifically, upper door 18 has a first pair of linkage arms consisting of a forward arm 36 and a rearward arm 38. An identical pair of arms are connected to the upper door adjacent the opposite edge and are not seen in FIG. 3. In like manner, lower door 20 has a first pair of pivot linkage arms consisting of a forward arm 40 and rearward arm 42. The door has a corresponding opposite pair of arms not seen in FIG. 3.

The linkage arms serve to pivot and translate the upper and lower doors from their stowed to their deployed positions. The doors are typically moved from stowed to deployed positions and vice versa by means of hydraulic cylinders, such mechanism not being illustrated since it is of the type commonly employed for actuation of thrust reverser doors and is within the scope of the skill practitioner. The mechanism for structurally supporting the doors and the actuating mechanism is contained within and covered by the stang fairings.

Figure 2:
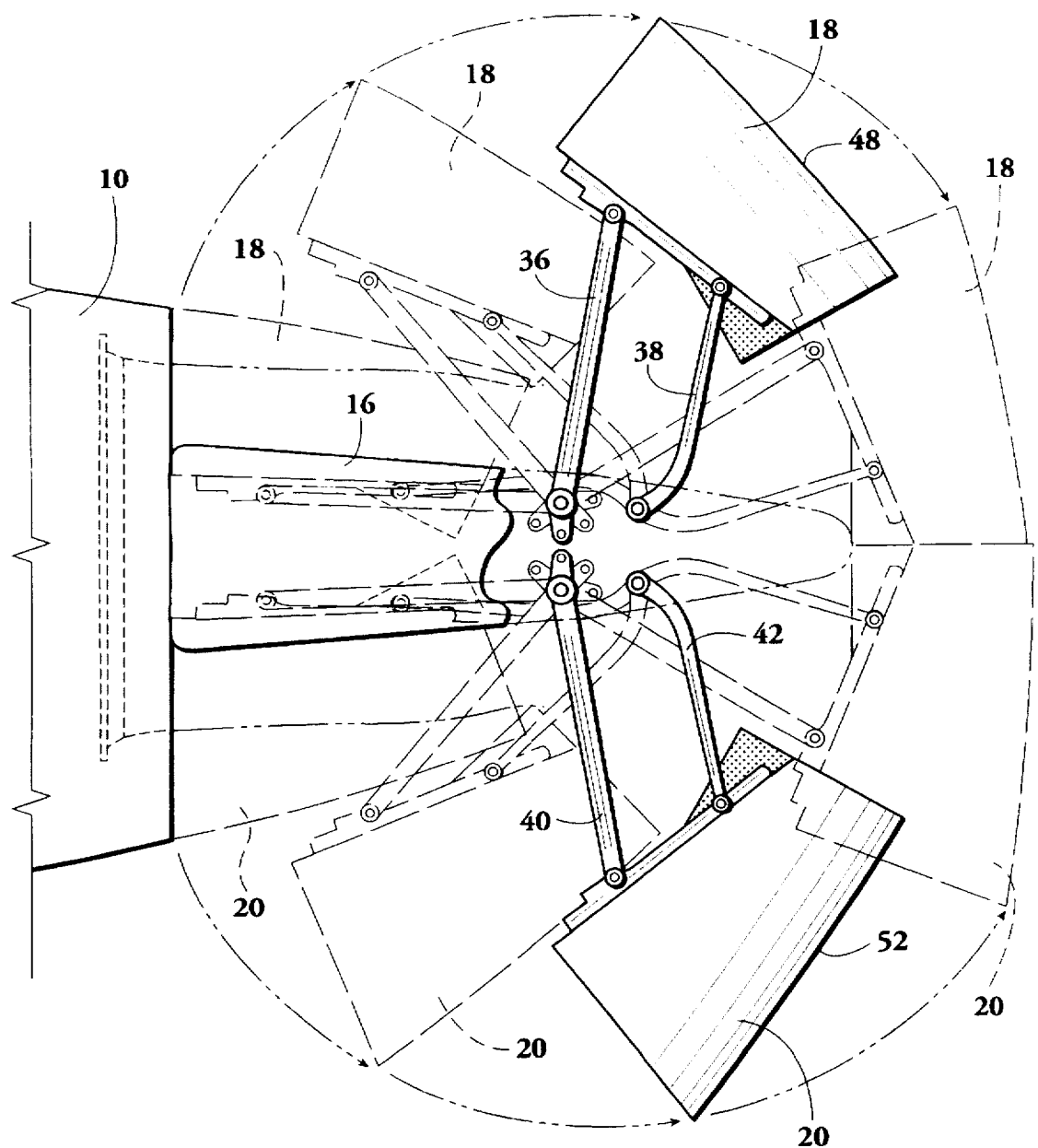
FIG. 2 is an elevational side view of the rearward portion of the jet aircraft engine as shown in FIG. 1.

FIG. 2 is like FIGS. 3 and 5 but shows intermediate positions of the upper and lower doors as they are translated from the stowed to deployed positions. FIG. 2 shows in a dotted outline the upper and lower doors in the deployed position as in FIG. 3, in another dotted outline shows the doors in the stowed position as in FIG. 5, and in a solid and another dotted outline shows the doors in intermediate positions.

Figure 1:
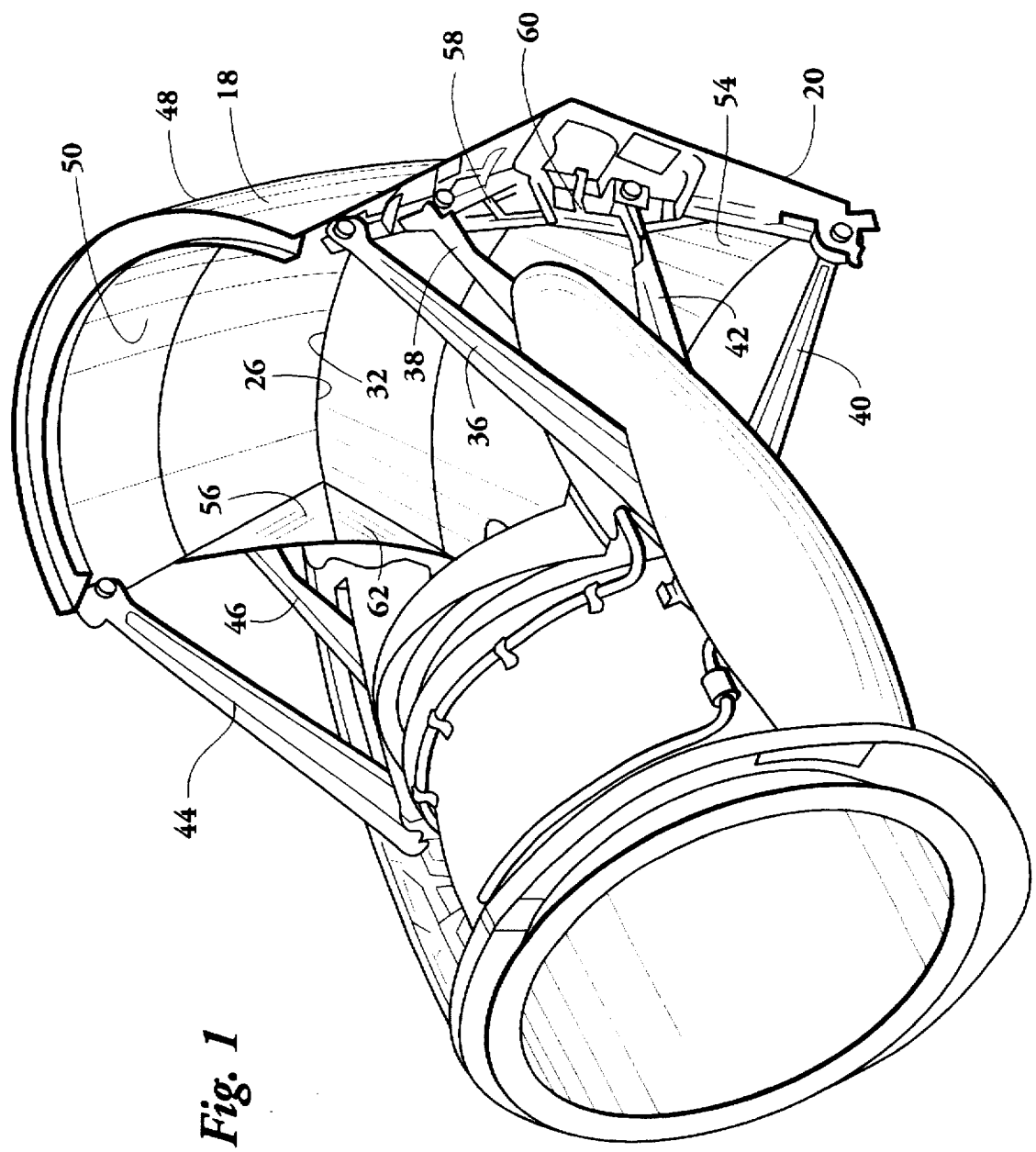
FIG. 1 is an isometric view of the rearward portion of a jet engine employing the improved thrust reverser of this invention.

FIG. 1 is an isometric view illustrating the appearance of the doors in their deployed positions and illustrates more typical structural details. This figure reveals, with reference to upper door 18, the opposite pair of linkage arms, specifically forward linkage arm 44 and rearward linkage arm 46 that are the mating pairs with linkage arms 36 and 38 as previously identified. The corresponding pairs of linkage arms that match with lower door linkage arms 40 and 42 are not seen.

Each of the doors has an inner and outer surface. As an example, upper door 18 has an outer surface 48 and an inner surface 50. In like manner, lower door 20 has an outer surface 52 as seen in FIG. 2 and an inner surface 54 as seen in FIG. 1. Outer surfaces 48 and 52 are configured to aerodynamically match engine nacelle 10 (see FIG. 5) when the doors are in their stowed positions. Inner surfaces 50 and 54 provide a target surface for deflection of jet engine exhaust gases when the doors are in the deployed position as seen in FIGS. 1 and 3.

An important feature of the thrust reverser system of this invention is the provision of a means to enlarge the target area for augmenting the reverse thrust force tangents produced by jet engine gases. To achieve this result, each of the upper and lower doors is provided with a pair of side filler panels. Specifically, upper door 18 has opposed side filler panels 56 and 58. In like manner, lower door 20 has a pair of side filler panels 60 and 62 (See FIGS. 1, 2, 3 and 4). Each of the side filler panels is formed as substantially a triangular element at the juncture of a door rearward semi-circular end and a longitudinal side edge. As an example, side filler panel 58 as seen in FIGS. 1 and 3 is formed at the juncture of upper door 18 longitudinal edge 28 and rearward end 26. In like manner, side filler panel 60 is formed as a part of lower door 20 at the juncture of longitudinal edge 34 and rearward end 32. The opposite side panels are positioned in the same way, that is, at the juncture of each of the doors longitudinal edge and rearward end.

Figure 4:
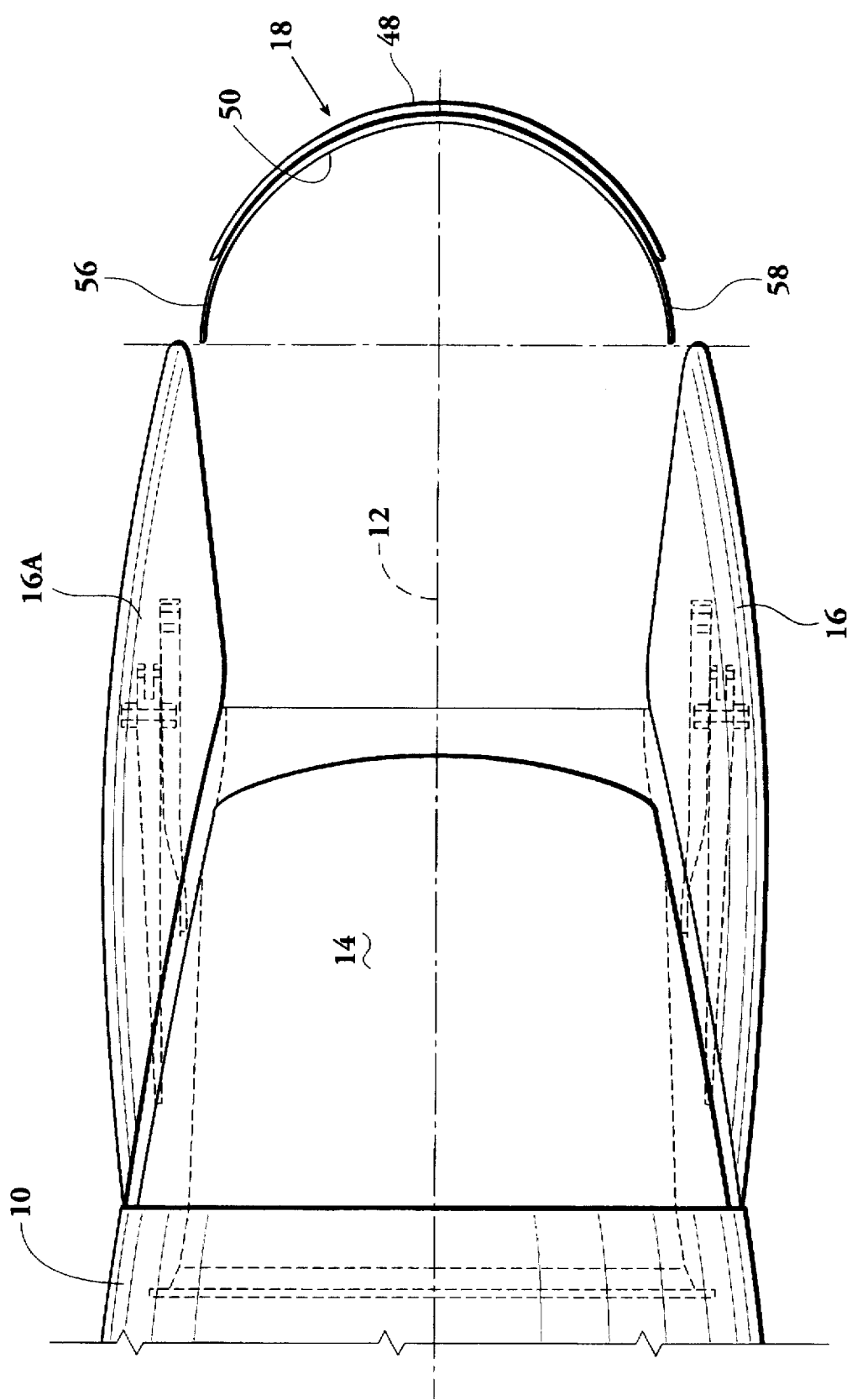
FIG. 4 is a top plan view of the rearward portion of a jet engine showing the stang fairings extending rearwardly of the jet engine exhaust nozzle and showing diagrammatically the concave inner surface formed by the doors when the doors are deployed and showing the increased area and increased concavity of the target surface provided by the use of the side filler panels of this invention.

While illustrated as being generally triangular members, the side panels may be an extension of the inner surface of each of the upper and lower doors. FIG. 4 is a diagrammatic illustration of this arrangement showing, by example, upper door 18 having an outer surface 48 and inner surface 50 and showing the inner surface extending to form the opposed side filler panels 56 and 58.

FIG. 4 further diagrammatically illustrates the concave target surface formed by the inner surfaces of the doors when in deployed positions. Further, it can be seen that by the inclusion of side filler panels 56 and 58 the target area is significantly increased to thereby increase the thrust reversing tangent caused by the exhaust gases.

In FIG. 3 a direction of movement of deflected exhaust gas in a vertical plane is illustrated by the arrow 64. This direction of exhaust gas deflection includes a reverse thrust force tangent indicated by the dotted line 66. This thrust tangent is in the direction parallel to the engine axis and opposite to the forward direction of the aircraft. Thus this thrust tangent applies direct breaking force to counteract the inertia of the aircraft upon landing. While FIG. 3 shows the direction of diverted exhaust gas in only one direction a substantially similar thrust vector force exists substantially 360 around the thrust reverser so that all of the diverted exhaust gas has a thrust reversing tangent. By the provision of the side fillers, the thrust reversing tangent 64 created when the thrust reverser doors are deployed is increased significantly and in a manner that adds only small additional weight to the aircraft.

It can be seen in FIG. 2 that in the stowed position the side filler panels extend within the confines of the stang fairing so that the side filler panels do not interrupt the streamline contour of the engine nacelle when the doors are in stowed positions.

The claims and the specification describe the invention presented and the terms that are employed in the claims draw their meaning from the use of such terms in the specification. The same terms employed in the prior art may be broader in meaning than specifically employed herein. Whenever there is a question between the broader definition of such terms used in the prior art and the more specific use of the terms herein, the more specific meaning is meant.

While the invention has been described with a certain degree of particularity, it is manifest that many changes may be made in the details of construction and the arrangement of components without departing from the spirit and scope of this disclosure. It is understood that the invention is not limited to the embodiments set forth herein for purposes of exemplification, but is to be limited only by the scope of the attached claim or claims, including the full range of equivalency to which each element thereof is entitled.

What is claimed:

1. For use with an aircraft engine nacelle, the engine having a nozzle through which thrust producing engine exhaust gases pass, an improved target-type thrust reverser system comprising:

a first door having substantially the shape of a segment of a hollow frusto-conical member having inner and outer surfaces, having opposed longitudinal edges that taper towards each other and having a forward and a rearward edge;

a second door shaped substantially as said first door and having inner and outer surfaces, having opposed longitudinal edges and having a forward and a rearward edge;

linkage arms pivotally supporting each of said first and second doors, the doors being translatable between stowed and deployed positions, the exterior surfaces of said doors in their stowed positions forming a part of the exterior surface of the engine nacelle and when in their deployed positions the said rearward edges of said first and second doors abutting and the doors longitudinal edges intercepting each other in opposed obtuse angles;

the inner surfaces of said doors forming a generally concave exhaust gas intercepting target that diverts exhaust gases from said nozzle in directions having reverse thrust force tangents; and a pair of side filler panels attached to and functioning integrally with each said door, a filler panel being positioned at the junction of each of said longitudinal edges and said rearward edges of each said door, each side filler panel conforming with said inner surface of the door to which it is attached to thereby enlarge said concave exhaust gas intercepting target.

2. For use with an aircraft jet engine nacelle, the engine having a longitudinal axis and a nozzle through which exhaust gases pass, the nacelle having opposed first and second stang fairings, portions of which extend rearwardly of the nozzle and generally in a plane of the engine longitudinal axis, an improved target-type thrust reverser system, comprising:

a first door having substantially the shape of a segment of a hollow frusto-conical member having inner and outer surfaces, having opposed longitudinal edges that taper towards each other and having a forward and a rearward edge;

a second door shaped substantially as said first door and having inner and outer surfaces, having opposed longitudinal edges and having a forward and a rearward edge;

linkage arms pivotally supporting each of said first and second doors, the doors being translatable between stowed and deployed positions, the exterior surfaces of said doors when in their stowed positions forming a part of the exterior surface of the engine nacelle and when in their deployed positions the said rearward edges of said first and second doors abut each other and said doors longitudinal edges intercept each other in opposed obtuse angles, the inner surfaces of said doors, when said doors are in said deployed positions, forming a generally concave exhaust gas intercepting target that diverts exhaust gases from said nozzle in directions having reverse thrust force tangents; and a pair of side filler panels affixed to and functioning integrally with each of said doors at the junction of each of said longitudinal edges and said rearward edge, the side filler panels serving to conform with and enlarge said concave exhaust gas intercepting target.

3. An improved target-type thrust reverser according to claim 2 wherein said arms pivotally supporting each of said first and second doors are covered by said stang fairings when said doors are in their stowed positions.

4. An improved target-type thrust reverser according to claim 2 wherein said side filler panels are covered by said stang fairings when said doors are in their stowed positions.

5. An improved target-type thrust reverser according to claim 2 wherein said forward edge of each of said doors is substantially semi-circular and wherein said rearward edge of each of said doors is substantially semi-circular and of diameter less than said forward edge.

6. An improved target-type thrust reverser according to claim 2 wherein each of said side filler panels is substantially triangular providing a longer length edge and two shorter length edges, the longer edge of each side filler panel being affixed to a longitudinal edge of a said door.

* * * * *